April 10, 1962  J. B. DANNENBAUM  3,028,967
APPARATUS FOR THE TREATMENT OF SANITARY SEWAGE
Filed Jan. 20, 1958  5 Sheets-Sheet 1
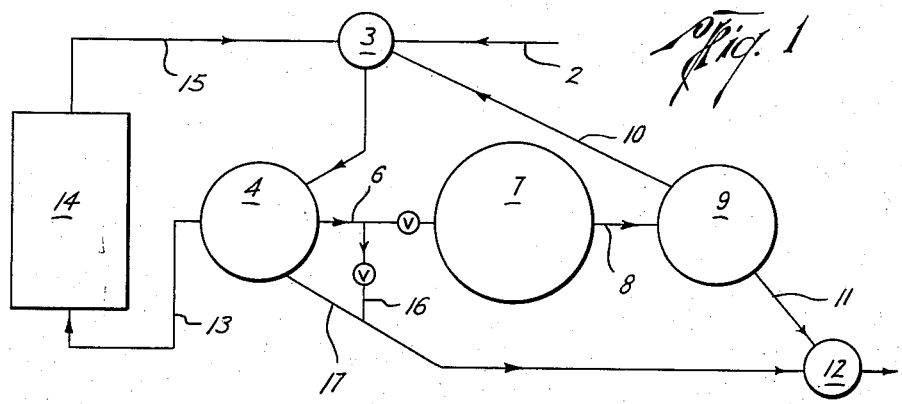
Fig. 1
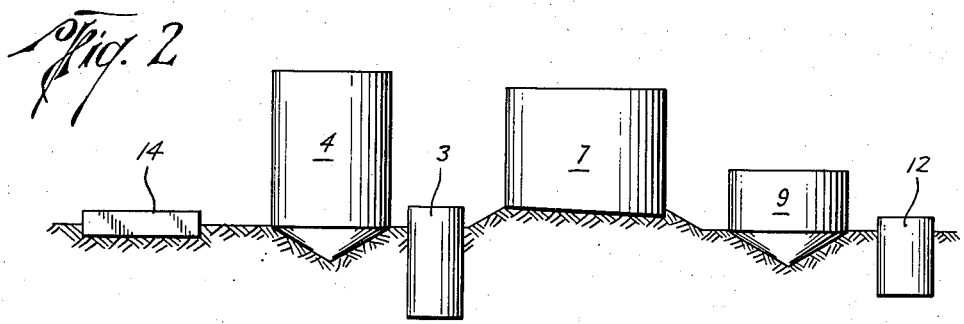
Fig. 2
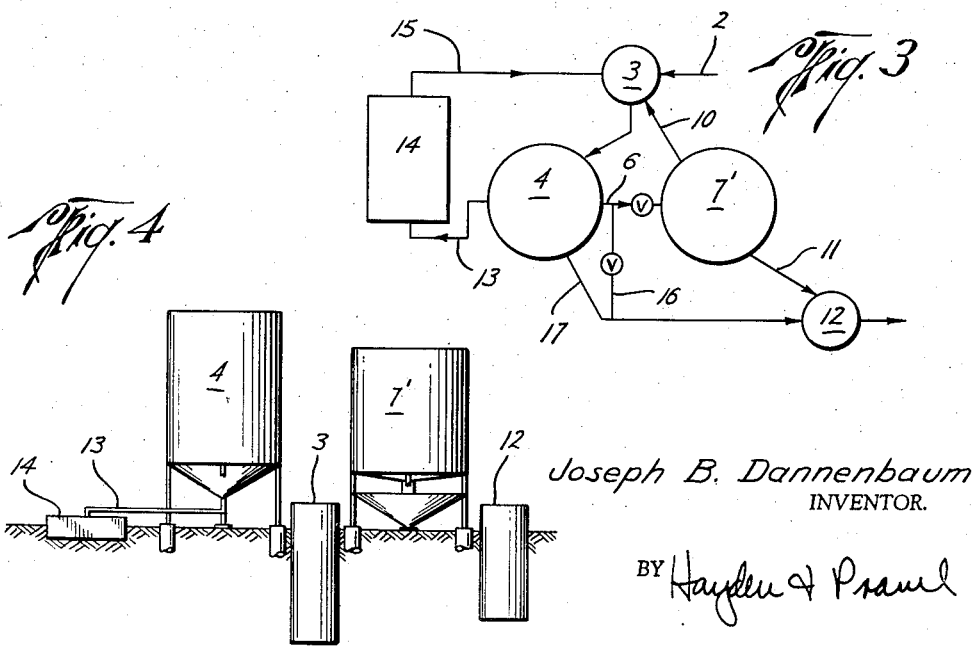
Fig. 3
Fig. 4
Joseph B. Dannenbaum
INVENTOR.
BY Hayden & Pramel
ATTORNEYS April 10, 1962  J. B. DANNENBAUM  3,028,967
APPARATUS FOR THE TREATMENT OF SANITARY SEWAGE
Filed Jan. 20, 1958  5 Sheets-Sheet 2
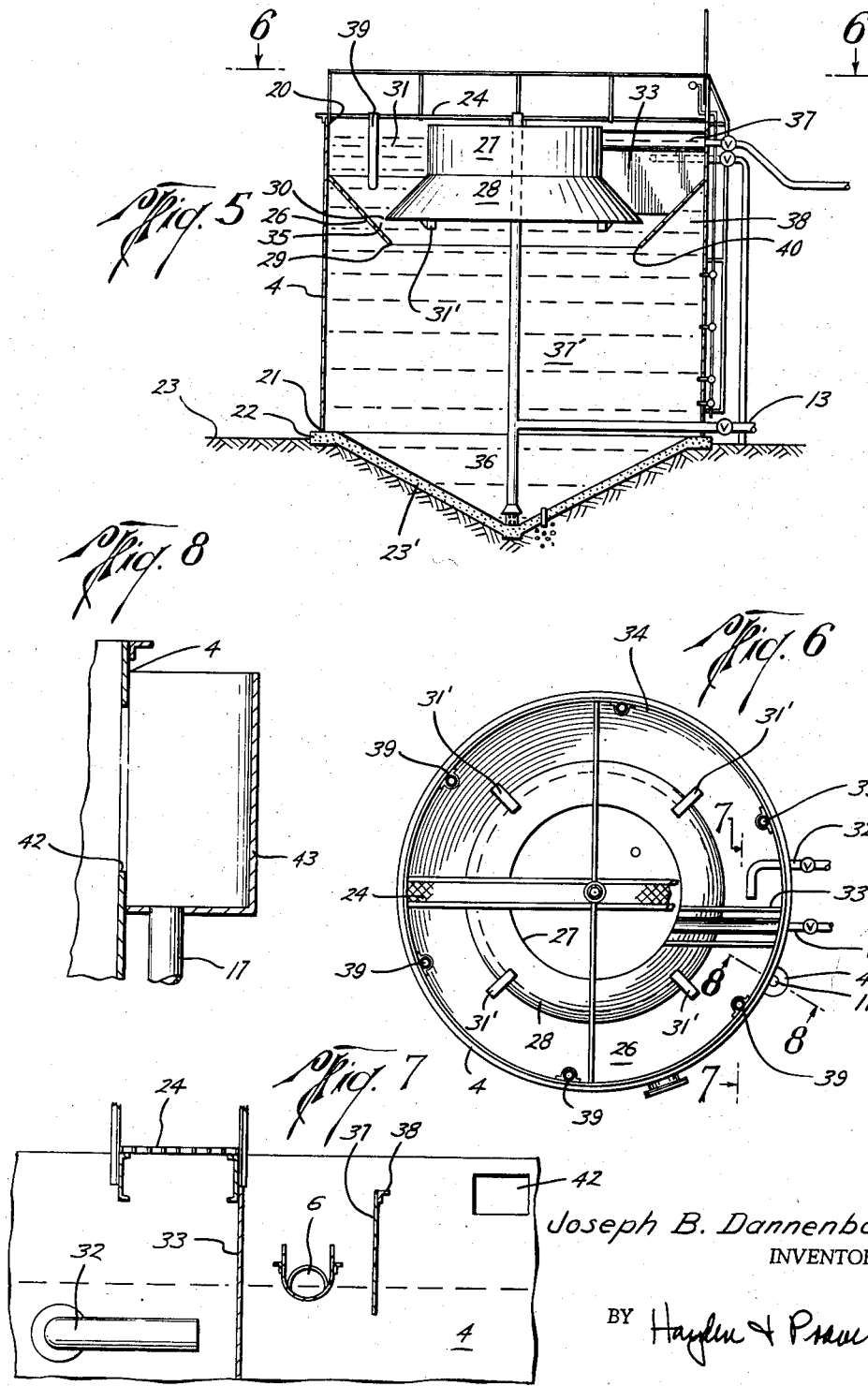
Joseph B. Dannenbaum
INVENTOR.
BY Hayden & Pravel
ATTORNEYS

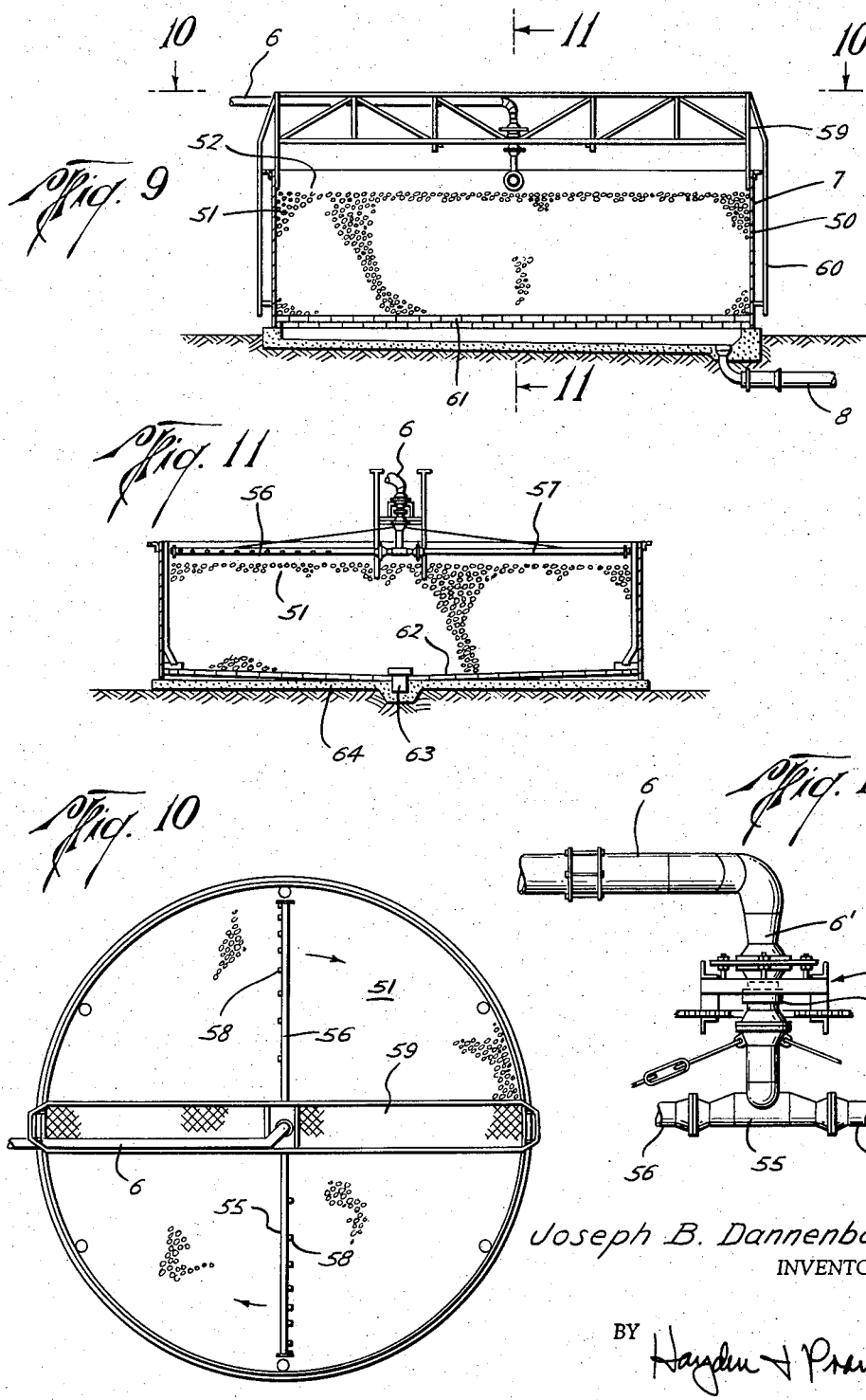

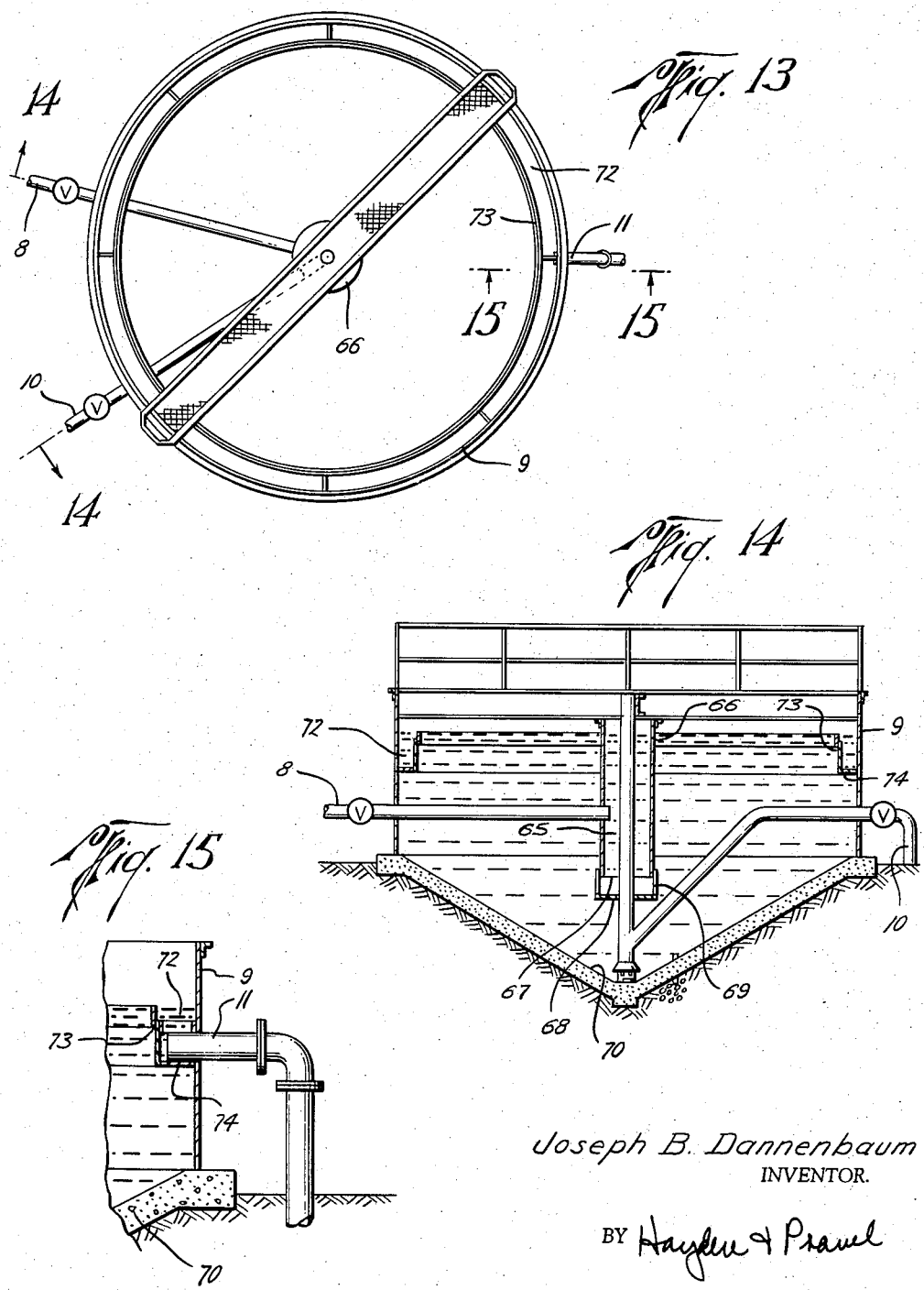

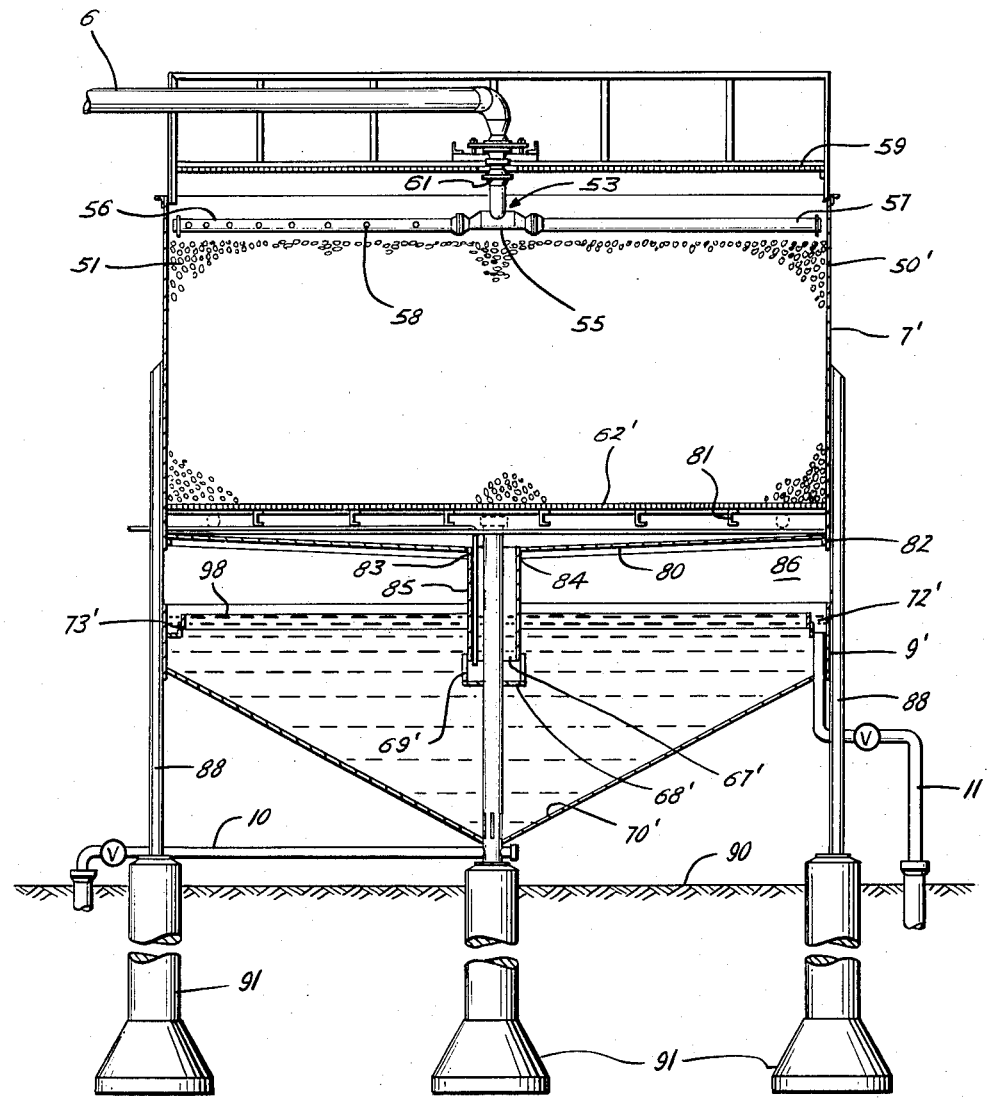

United States Patent Office 3,028,967
Patented Apr. 10, 1962

3,028,967
APPARATUS FOR THE TREATMENT OF SANITARY SEWAGE
Joseph B. Dannenbaum, 2414 W. Alabama, Houston, Tex.
Filed Jan. 20, 1958, Ser. No. 710,140
3 Claims. (Cl. 210—180)

The present invention relates to a process and apparatus for the treatment of sanitary sewage.

An object of the present invention is to provide a process for the treatment of sanitary sewage from domestic and industrial sources, wherein radiant solar heat is utilized throughout the process to accelerate the settling of solids from the liquid in the sewage, to accelerate the digestion of the settled solids, and to promote aerobic bacterial action as well as anaerobic bacterial action in the process where desired.

Still another object of the present invention is to provide a sewage treatment process wherein the sewage is initially conducted to a primary sedimentation chamber for separation of liquids from the solids and simultaneous digestion of the solids in the same container, withdrawing the liquid from the container and passing it through a trickling filter and thereafter subjecting the liquid to a final clarification wherein any additional solids are removed from the liquid.

Still a further object of the invention is to provide apparatus for sewage treatment which is adapted to be supported above the earth's surface whereby radiant solar heat may be absorbed into the apparatus to aid in the sewage treatment as the sewage flows through the apparatus.

A further object of the present invention is to provide a novel construction of an initial clarifying tank for use in sewage treatment, wherein the raw sewage is conducted into the clarifier in a predetermined manner so that the flow of the sewage within the container is in a horizontal circumferential path to aid in separating solids from the liquid in the sewage, said apparatus being constructed and arranged so that the settled solids may be digested in the same container and the gases of digestion discharged from the container without disturbing the incoming flow of sewage into the container.

Still a further object of the present invention is to provide a combination trickling filter and final clarifying apparatus for use in sewage treatment which are constructed and arranged to be mounted above the earth's surface, the trickling filter having a catch pan at the lower end thereof to receive the sewage being treated from the trickling filter and to conduct it into the final clarifying tank associated with the trickling filter in a manner so as to create a minimum of disturbance in the clarifier which aids in separating any additional solids from the liquid in the final clarifier.

Yet a further object of the present invention is to provide a sewage treatment process wherein the apparatus is mounted on the earth's surface so that after the raw sewage has been dumped into the initial apparatus, gravity flow through the system may thereafter be relied upon thereby eliminating the necessity of providing additional pumping equipment as the sewage is flowed from one piece of apparatus to another, the position of the apparatus above ground also being beneficial in that radiant solar heat is absorbed through the apparatus which aids in the sewage treatment process.

Yet a further object of the present invention is to provide a process and apparatus for sewage treatment wherein the maximum throughput of sewage may be treated with a minimum amount of initial equipment investment and a minimum cost of operation.

Other objects and advantages of the invention will become more readily apparent from a consideration of the following description and drawings wherein:

FIG. 1 is a schematic flow diagram of one form of the invention;

FIG. 2 is a side view of the apparatus illustrated schematically in FIG. 1;

FIG. 3 is a schematic flow diagram of another embodiment of the invention;

FIG. 4 is a side view of the schematic flow diagram of FIG. 3;

FIG. 5 is a vertical sectional view partly in elevation showing the details of construction of the initial clarification tank or container;

FIG. 6 is a view on the line 6—6 of FIG. 1 to more clearly illustrate the relative position of the structural components in the initial clarifier tank or container;

FIG. 7 is a view on the line 7—7 of FIG. 6 to further illustrate the relative position of the inlet and outlet of the container shown in FIGS. 5 and 6;

FIG. 8 is a view on the line 8—8 of FIG. 6 showing the arrangement of the overflow provided for the container;

FIG. 9 is a sectional view, partly in elevation, showing the form of the trickling filter used with the invention as shown in FIGS. 1 and 2 of the drawings;

FIG. 10 is a top plan view on the line 10—10 of FIG. 9 showing the arrangement of the rotary distributor nozzle over the rock filter bed shown in FIG. 9;

FIG. 11 is a sectional view on the line 11—11 of FIG. 9 showing the arrangement of the sloping of the trickling bed filter for withdrawing of liquid from the bottom of the filter;

FIG. 12 is an enlarged detailed view of the rotary head used for discharging the liquid on to the top of the filter bed;

FIG. 13 is a top plan view of the final clarifying tank or container used with the form of the invention shown in FIGS. 1 and 2;

FIG. 14 is a sectional view on the line 14—14 of FIG. 13 showing the inlet to the final clarifying tank or container, the outlet or overflow wier adjacent the outer edge thereof and the line for sludge withdrawal from the bottom of the container;

FIG. 15 is a sectional view on the line 15—15 of FIG. 13 showing in enlarged form the arrangement of the outlet for withdrawing the liquid from the final clarifying tank or container; and FIG. 16 is a side sectional view showing a container which combines the trickling bed filter and the final clarifying tank.

In FIG. 1 the raw sewage inlet line to the system is represented by the numeral 2. The raw sewage is dumped into the receiving container or manhole 3 and from here it is pumped to the first treatment container or tank 4. In the first treatment container the settleable solids are separated from the liquids, and the liquids discharged through the line 6 to the filter 7. From the filter 7 the flow is conducted through the line 8 to the final treatment tank 9 wherein any additional solids are separated from the liquid, the solids discharged through the line 10, back to the initial receiving chamber or container 3. The liquids are discharged through the line 11 to a chlorinator illustrated at 12, wherein the liquids are subjected to chlorine treatment for additional purification.

The settled liquids from the initial container 4 are passed through the line 13 to the drying beds 14, and any liquid or sludge from the drying bed may be conducted through the line 15 back to the receiving chamber or container 3 for subsequent treatment along with a fresh charge of raw sewage. A by-pass line 16 communicates the line 6, so that, if desirable, at times the liquid 6 from the initial container or treatment chamber 4 may be passed directly to the chlorinator 12. The line 17 communicates with the chamber 4 and provides an overflow arrangement for the container so that if the container 4 gets too full, liquid may be withdrawn therefrom and passed directly to the chlorinator 12.

In FIG. 3, the inlet sewage comes in the line 2 and is discharged into the receiving container or manhole 3 and is then discharged to the initial treatment container or tank 4 wherein the settleable solids are removed from the liquid. The liquid is withdrawn through the line 6 and conducted to the combination trickling filter and final clarifying container 7' with the sludge from the bottom of the unit 7' being passed through the line 10 back to the receiving container 3 where it is mixed with the raw sewage and passed again through the system. Liquid from the unit 7' is conducted through the line 11 to be treated in the chlorinator 12.

Similarly, as previously described with regard to the FIG. 1 modification, a by-pass line 16 is provided for drawing liquid off of line 6 when desired to communicate it directly to the chlorinator 12. Additionally, an overflow line 17 is connected to the top of tank 4 so that any overflow from the tank can also be communicated directly to the chlorinator 12 when and if necessary. The settleable solids from the bottom of the initial treatment chamber 4 are conducted through the line 13 to the drying bed 14, with any sludge or liquids from the drying bed being passed through the line 15 for re-treatment in the system along with the raw sewage introduced into the receiving container 3.

From the foregoing description, it can be readily appreciated that the system represented in FIGS. 1, 2, 3 and 4 is substantially the same with the exception that in FIGS. 3 and 4 modification, the filtering and final clarification procedures are combined in one unit.

Particular attention is directed to the fact that in the forms of the invention shown in FIGS. 1 through 4 inclusive of the drawings, the apparatus is positioned above the earth's surface, and the exterior of all tank surfaces, such as the tank 4, the tank 7 and the tank 9 in the FIGS. 1 and 2 modification, and the tanks 4 and 7' in the FIGS. 3 and 4 modification are coated with a protective type of coating on the exterior surface thereof, which is black in color to aid in absorption of radiant heat. Furthermore, the arrangement of the apparatus as illustrated in FIGS. 1–4, inclusive of the drawings is more economical than heretofore used, in that it eliminates the necessity of providing for pumps to conduct the fluid through the system. For example, as shown in the drawings a pump will be provided to conduct the raw sewage from the initial receiving container or chamber 3 to the primary treatment container or tank 4 which is positioned above the earth's surface. Thereafter, the liquid discharged from the initial chamber may by gravity flow to the filter 7, and by gravity the flow passes from the filter 7 to the final treatment tank 9. Similarly, in the FIGS. 3 and 4 modification, the liquid flows from the top of the container 4 to the unit 7'. The solids accumulating within the initial treatment chamber 4 may be pumped to the drying bed 14 and the line 15 may be positioned so that it will feed by gravity back to the initial receiving chamber 3. Also, the solids separated in the unit 9 of the FIG. 1 modification and the unit 7' of the FIG. 3 modification may be pumped back to the receiving chamber 3, and the liquids discharged through the line 11 in each modification to the chlorinator 12. The liquids may thereafter be pumped from the chlorinator 12 as desired.

From the above description it can be readily appreciated that a minimum number of pumps are used in the system since no pumps are required to conduct the liquid from one treatment container to the next.

Attention is directed first of all to the initial treatment container 4 which receives the raw sewage, including liquids and solids from the receiving chamber 3. In the initial treatment container 4, the settleable solids are separated from the liquid and the solids are thereafter digested in the bottom of the same container. The construction of the container 4 is unique in that it provides an arrangement for conducting the flow of sewage within the container in a predetermined path to aid in separation of the solids from the liquids, and it also is constructed so that the solids may be digested and any gases formed during such digestion discharged from the container without interfering with the flow of raw sewage into the tank and the settling of the solids therefrom. In FIG. 5 the construction of the unit 4 is shown in more detail. It will be noted that in the FIG. 5 drawing, the container 4 is shown as being positioned on a bottom formed in the earth's surface, whereas in the FIG. 4 modification the container and the bottom thereof are positioned so that the bottom is spaced from the earth's surface. The construction of the container 4 is the same in both situations; however, when the container 4 is positioned on the earth's surface, it seems obvious that the bottom thereof may be formed of cement with the sides of the container secured thereto. When the container 4 is positioned above the earth's surface, the shape of the bottom of the container will be the same, but it may be formed of steel or other suitable material similar to that from which the tank 4 and the other tanks in the system are formed. In FIG. 5 the cylindrical tank 4 is open at its upper end 20 and rests at its lower end 21 on the annular ledge 22 which is formed in the earth's surface and is a part of the conical bottom 23' of the tank which extends into the earth's surface as shown in FIG. 5 of the drawings. The cylindrical container 4 may be secured to the ledge 22 by providing an annular upwardly extending member (not shown) which is embedded in the cement ledge 22 as it is formed so that the lower end 21 of the tank 4 can be welded thereto to provide a leak proof construction.

It should be obvious that the tanks described in the instant invention may be of any suitable size from a few feet to many feet, depending upon the amount of sewage to be treated in the system. The size of the containers or tanks will vary from installation to installation and will be designed of a certain size to accommodate the quantity of sewage to be treated at each installation. The hollow cylindrical tank 4 is provided with a walk-way 24 extending across the top thereof, whereby access may be had to the top of the container 4 as desired by the operators of the system. Access may be gained to the walkway 24 across the top of the tank 4 by suitable means such as a ladder provided on the side of the tank, which ladder is of any well known construction and is not shown or described in detail.

It is desirable that all, or substantially all, of the settleable solids be removed from the liquid portion of the sewage in the container 4, and the solids and liquids separately discharged from the container 4 for subsequent treatment in the system. In order to obtain a maximum amount of separation of settleable solids from the liquid in the container 4, it is desirable to provide a flow path for the incoming sewage so that it may be conducted into the tank and along a flow path of maximum extent prior to discharge of the liquid so that as much solids as possible will settle therefrom. Furthermore, it is desirable to prevent undue agitation or turbulence in the flow path of the sewage from which solids are being separated, because any turbulence in the flow path would tend to inhibit or prevent the settling of the solids from the liquid.

The construction and arrangement of the tank 4 of the present invention is such that not only is the sewage conducted into the tank to obtain a maximum separation of solids from the liquid, but the settled solids are thereafter digested within the same tank, and the gases of such digestion used to maintain turbulence within the lower part of the tank to inhibit scum formation therein, and are thereafter discharged from the upper open end 20 of the tank without creating any disturbance or turbulence in the flow path wherein the solids are being separated from the liquid.

As shown in FIGS. 5–8 of the drawings, the tank 4 is provided with a continuous annular baffle 26 which is spaced from the upper end 20 of the tank 4 and extends downwardly and in toward the middle of the tank as shown in FIG. 5 of the drawings. This skirt may be secured to the inner wall of the container 4 by any suitable means such as welds or the like, and if desired, suitable bracing may be provided at spaced intervals extending between the tank wall and the nether side of the baffle 26. A drum 27 is concentrically arranged within the tank 4 at the upper end 20 thereof and is provided with an annular flared skirt 28 at the lower end thereof. The skirt 28 extends outwardly and downwardly in a direction opposite to the baffle 26 and as shown in FIG. 5 of the drawings, the skirt 28 terminates above the innermost end 29 of the baffle 26 and in spaced relation to the baffle as illustrated at 30. The drum 27 and the flared skirt 28 on the lower end thereof may be positioned within the container 4 by suitable means such as the braces 31′ which are secured to the skirt and to the baffle 26 at circumferentially spaced points thereabout. It will be noted that the diameter of the drum 27 is smaller than the diameter of the tank 4 so that the arrangement of the tank 4 relative to the drum 27, as well as the arrangement of the baffle 26 relative to the skirt 28 on the lower end of the drum 27 defines a flow path 31 for the raw sewage being conducted into the tank 4. As more clearly illustrated in FIG. 6, the inlet for the raw sewage from the receiving chamber 3 is shown at 32. A vertical baffle 33 is provided which extends between the tank and the drum 27 and between the skirt 28 and the baffle 26 so that when the raw sewage is discharged through the opening 32 it is directed against the baffle and flows in a reversed direction in the tank 4.

Because of the arrangement of the drum 27 and its skirt 28 in relation to the tank 4 and the baffle 26, the raw sewage is conducted horizontally and circumferentially around the outer edge 34 of the tank in the circuitous flow path 31. Thus, it can be appreciated that a maximum distance of flow is provided within the upper part of the tank 4 for the sewage in order to obtain a maximum amount of time for the settling of solids from the liquids prior to discharge of the liquid through the line 6.

Solids settled from the liquid will pass through the space 35 between the skirt 28 and the baffle 26 to move toward the bottom 36 of the tank.

As is more clearly illustrated in FIG. 7 of the drawings, it will be noted that the vertically extending wier 33 separates the inlet 32 and the outlet 6, each being on the opposite side of the baffle 33. As the flow in the horizontal circumferential path 31 approaches the outlet 6, it contacts the baffle 37 which is in spaced relation to the opening 6 and extends above and below the opening 6 as shown in FIG. 7 of the drawings. A slip 38 is provided at the top edge thereof and as the liquid flows over the lip 38 of the top of the baffle 37, any scum on the liquid is separated therefrom and retained within the tank 4. The liquid is then passed to the outlet 6 for subsequent treatment as will be described in more detail hereinafter.

The solids separated from the liquid are discharged to the bottom 36 of the tank 4 and are there digested prior to discharge to the drying bed 14. It is desirable that the solids be thoroughly digested within the tank 4 prior to the time that they are discharged to the drying bed 14 in order to eliminate odor therefrom and to render any substances in the solids 36 innocuous and to reduce them to stable form. The digestion of the solids in the bottom 36 of the tank 4 is accomplished under anaerobic bacteriological conditions, that is to say that bacteria accomplishes the digestion of the solids within the bottom of the tank 4 in the absence of oxygen.

Such bacterial cultures are well known in this art and, if necessary, an initial culture may be placed in the tank 4 at the time that the system is placed in operation.

The digestion of the solids in the bottom 36 of the tank 4 by anaerobic bacteria is enhanced by the radiant solar heat absorbed through the sides of the tank 4. Such solar heat absorption also aids in the initial settling of the solids from the liquid in the upper part of the tank.

Of course, as the solids are digested in the bottom of the tank 4, gases are created which must be discharged from the container 4 and discharged in a manner so as to not create turbulence and interfere with the settling of the solids in the horizontal circumferentially extending flow path 31 at the top of the tank 4. Also, the gases are used to agitate the lower portion 37 of the tank immediately above the bottom thereof so as to effect intimate mixing of the solids with the bacteria to obtain complete digestion, such gas also acting to inhibit the formation of scum or the collection of large masses of solids in the area 37′ of the tank 4. The gases pass upwardly in the container and if they become trapped in the tank below the baffle as illustrated at 38, they may be discharged through the vent pipes 39 which are circumferentially spaced about the tank as shown in FIG. 6 of the drawings, and extend through the baffle 26. Of course, any gases passing upwardly in the tank 4 through the circular opening 40 defined by the lower or innermost end 29 of the baffle 26 will pass upwardly into the skirt 28 to be discharged through the drum 27. Thus, gas from all portions of the tank 4 are discharged through the open upper end 20 thereof without effecting or creating any disturbance in the flow path 31 in the upper part of the tank.

After suitable digestion of the sludges or solids within the tank 4, they may be conducted through the line 13 by any suitable pump means to the drying bed 14. The sludge, when digested in the manner and by the apparatus as previously described produces an odorless sludge on the drying bed which has high shrinkage upon drying. This results in a very crumbly sludge when removed from the drying bed and it may be very easily applied as a fertilizer on lawns and for use in gardens.

As previously mentioned, the tank 4 is positioned above the earth's surface and is coated with an exterior protective surface which is black in color to aid in the absorption of radiant solar heat. This solar heat is imparted to the interior of the tank so that sedimentation or settling of the solids from the liquid in the flow path 31 is advanced since such heat enhances the settling rate because it reduces the viscosity of the liquid portion of the sewage. The infra-red radiation to the interior of the tank also facilitates the digestion of the solid particles separated from the sewage in that it promotes the activity of the anaerobic bacteria.

If the container 4 becomes overloaded for some reason or another, suitable means as illustrated in FIGS. 7 and 8 are provided for discharge of any overflow from the tank. Such overflow is shown as being in the form of an opening 42 which is spaced from the baffle 33 and communicates with the conduit 17 connected into the catch-basin 43 mounted on the side of the tank 4 adjacent the opening 42. While the probability of overflow from the tank 4 is not very great, should it occur it consists principally of liquid from which the solids have been separated so that the liquid, if desired, may be passed directly to the chlorinator 12 for treatment and subsequent discharge from the system. Of course, if desired, a suitable line may be provided for conducting any overflow from the tank 4 back to the receiving chamber 3 for retreatment in the tank 4 along with additional fresh sewage.

Any liquids drawn off of the solids in the drying bed 14 may be conducted through the line 15 back to the collection tank 3 for treatment in the tank 4, along with additional raw sewage.

The liquid from the tank 4 passes through the line 6 connected into the tank 4 at the top thereof so that such liquid by gravity may be fed to the other components in the system. The liquid from the container 4 is conducted through the line 6 and discharged into the tank 50 which is also arranged so that it extends above the earth's surface in order to absorb radiant solar heat. A filter bed 51 on the inside of the container 50 is formed of suitable sized particles and the liquid is adapted to be discharged on to the top 52 of the filter bed so that it trickles down through the bed 51. As the liquid passes down through the bed 51 it is subject to aerobic biological action. The absorption of radiant solar heat into the filter bed 51 causes heating of the air in the voids between the particles of material comprising the filter bed, such heating occurring primarily adjacent the tank shell and this creates a movement of the air which causes the air to move upward adjacent to the tank shell and thereby causes a down draft of air in other portions of the filter rock bed 51, in order to replace the heated air moving upwardly adjacent the tank shell. This increased circulation of air provides additional oxygen which encourages and aids the aerobic treatment of the liquid passing through the bed.

In order to obtain a maximum uniform distribution of liquids over the filter bed 51, the liquids are discharged through the arrangement illustrated generally at 53 in FIG. 12 of the drawings. The arrangement 53 includes a swivel joint 54 which is supported on the downwardly depending end 6' of the fluid conducting line 6. A distributor rod 55 is secured to the swivel joint 54 and extends laterally on each side thereof as shown at 56 and 57 in FIG. 11 of the drawings. A plurality of nozzles 58 are provided in the side of each of the laterally extending portions 56 and 57 of the distributor rod 55 and as the liquid is discharged from the line 6 through the swivel 54 and into the distributor rod 55, rotation of the extensions 56 and 57 is effected as the fluid is discharged through the nozzles 58. Thus, the liquid is sprayed over the top 52 of the filter bed 51 and also such spraying effects intimate commingling of the air with the liquid as it falls on to the filter bed to further aid in the aerobic treatment of the liquid.

FIG. 9 illustrates the tank 50 of the trickling filter 7 as being provided with a walk 59 to which access may be had by means of the ladder 6 on the side of the tank. The arrangement 53 shown in FIG. 12 of the drawings provides a means whereby the liquid may be sprayed into the filter bed from the top thereof. Heretofore, it has been customary to support the liquid discharge apparatus in the filter 7 at a point below the top 52 of the filter bed 51 so that if access to the liquid distributing equipment were necessary for repair or replacement, it has been necessary to interrupt the operation of the system and to tear up the filter bed 51 to gain access to the liquid distribution system. The present invention overcomes such construction in that the liquid distribution arrangement is arranged above the filter bed 51 so that access may be had thereto without disturbing the filter bed 51 or the operation of the system.

After the liquid has passed through the filter bed it is gathered by means of the tiles 61 at the bottom of the tank 50 of the trickling filter 7. The construction and arrangement of the tiles 61 is well known in the art and no detailed description is believed necessary. It will be noted as shown in FIG. 11 of the drawings that the tiles 61 slope as shown at 62 towards the center of the tank and a channel 63 is provided in the bottom 64 of the tank so that the liquids may be collected therein for subsequent passage to other components in the system.

Attention should be directed to the fact that in the filter construction shown in FIGS. 9–12, inclusive, the tank 50 is mounted on the bottom 64, the bottom 64 being formed of cement or other suitable material. When the cement bottom 64 is poured, suitable means in the form of an annular metallic ring may be provided therein whereby the tank 50 can be welded thereto to inhibit leakage from the tank.

The areobic treatment of the liquid within the filter 7 is promoted by the additional oxygen caused by the air movements as described hereinabove, and also by the increased temperature of the air due to the heating thereof by radiant solar energy. This converts noxious substances in the liquid into more stable forms such as nitrates and the like, which are less objectionable than unstable compounds or constituents which may be found in the liquid from the initial treatment stage. From the channel 63 in the trickling filter 7, the liquids are conveyed by means of the line 8 to the center 65 of the final settling tank 9 as shown in FIG. 1. A well 66 is provided in the center of the tank in which the fluid from the line 8 is discharged. Such fluid flows downwardly and passes out the open end 67 in the lower end of the well 66. A baffle 68 is mounted in spaced relation relative to the lower open end 67 of the well 66 and is secured to the well 66 by any suitable means such as the straps 69. This prevents the fluid flow from impinging against the bottom 70 of the tank 9 which would create disturbance in the settled solids resting on the bottom 70.

The liquid flowing from the opening 67 is in sheet-like form and gradually upwardly so that any additional solids in the liquid tends to separate therefrom. Of course the rate of movement of the liquids in the tank 9 is such that settling of solids from the liquid is encouraged and a substantially clear effluent would be discharged into the passageway 72 circumferentially arranged adjacent the outer edge of the tank 9. The discharge passageway 72 is formed by the baffle 73 arranged in spaced relation to the tank 9 and closed at its bottom by means of the annular ring 74. As the liquid reaches the top of the baffle 73 it flows thereover and an outlet pipe 11 communicates with the passage 72 whereby liquid may be conducted from the final clarification tank 9 to be passed to the chlorinator 12 shown in FIG. 1 of the drawings. Any solids collected in the bottom 70 of the tank 9 may be conveyed by means of the line 10 communicating with the bottom 70 of the tank 9 to the container 3 for subsequent treatment with additional raw sewage.

It should be noted that radiant solar energy also acts against the tank 9 and the liquid therein of course is subject to the heat transfer which occurs through the wall of the tank which aids in the treatment of the liquid.

Also, the radiant solar heat which increases the fluid temperatures adjacent the tank shell causes circulation upwardly around the perimeter of the tank and thereby decreases the velocity of the liquid sheet flow towards the over flow weir or baffle 73. The outer upward movement of the liquid enhances and promotes downward movement of the settleable solids in the central portion of the tank.

The tank 9 may be fixed to the cement bottom 70 by suitable means as previously described with regard to the initial treatment tank 4 and the trickling filter 7.

In some situations it may be desirable to mount the system above the earth's surface, in which event suitable support legs could be provided for the various containers as illustrated in FIG. 4 of the invention.

Additionally, FIGS. 3 and 4 of the drawings illustrate a modification of the invention wherein the trickling filter 7 and the final treatment tank 9 of the FIG. 1 modification have been combined into a single unit or step.

FIG. 16 of the drawings illustrates the details of construction of the unit 7' which is the combined form of the filter and the final clarification or sedimentation step. The pipe 6 as shown in FIG. 16 conducts the liquid from the initial tank 4 to the distributing arrangement illustrated at 53, whereupon the liquid is discharged through the nozzles 58 in the laterally extending portions 56 and 57 of the rotary distributor head 55. The filter bed 51 in the tank 50' of the modification shown in FIG. 16 is identical in all respects in arrangement and function with that previously described with regard to the form of the invention described in FIGS. 9–12 inclusive. A grating 62' is provided at the bottom of the tank 50' so that the liquid from the filter bed may pass therethrough and onto the collection pan 80 at the bottom of the tank 50'. It will be noted that a plurality of channel members 81 are provided at spaced intervals along the bottom of the tank 50' to support the grating 62' in position therein. The collection pan 80 slopes from its outer edge 82 toward the middle 83 and is provided with an opening 84 therethrough into which is connected the downwardly extending tube 85. The tube 85 serves to conduct the liquid from the filter bed 51 into the conical shaped tank 9'. It will be noted that the tank 9' is spaced beneath the collection pan 80 so that air may freely circulate in the space 86 between the tank 9' and the collection pan 80 on the bottom of the tank 50'. A plurality of legs 88 are secured to the tank 50' and also to the tank 9' and maintain it in proper position relative to the earth's surface represented at 90. If desired, the legs 88 may each be supported on the footings 91 which are arranged in the earth's surface in a manner well known in engineering circles for supporting structures by footings. A baffle 68' is arranged relative to the lower open end 67' in the tube 85 so that liquid discharged through the tube 85 will impinge against the baffle 68' and well thereby be prevented from striking the bottom 70' of the tank 9' which might serve to cause agitation of the sludge deposited therein.

Since the tube 85 is beneath the liquid surface 98 in the tank 9', the flow in the tank 9' is such that it will not disturb the movement of the liquid upwardly within the tank to be discharged over the baffle 73' which is constructed and arranged similar to the baffle 73 in the description with regard to the construction shown in FIG. 14 of the drawings. As the solids separate and settle from the liquid in the tank 9', they may be discharged through the line 10 to be passed back to the collection tank 3 for subsequent treatment along with additional raw sewage injected in the system. The clear liquid from the passage 72' in the tank 9' is conducted through the line 11 to pass to the chlorinator 12 where it may be treated and discharged from the system.

One of the primary advantages with a sewage treatment process and apparatus as described is that it is much more economical to install than the conventional type sewage plan. Furthermore, the invention provides a system which incorporates apparatus to maintain the operating cost at a minimum due to the general absence of machinery such as pumps and the like which require constant attention and repair, and also require a higher quality of operators.

Each of the tanks of the system can be coated internally with a protective coating so that the metal tanks will be protected from any constituents or components in the sewage which might otherwise tend to corrode or deteriorate the tank.

Another advantage with the present invention is that it can be moved from one location to another location with very little loss of original installation equipment, and this makes the process and the apparatus used therewith particularly advantageous for use in areas which may be later developed and become part of established communities. The portability of the system also makes it particularly useful for temporary installations in most civilian and military situations.

The arrangement of the components of the system as described above makes them readily available for repair or replacement and the equipment such as the spray nozzle used in the trickling filter can be removed or repaired without the necessity of tearing apart the filter bed which is customary with installations of conventional types in use at the present time.

The absorption of radiant heat in the system increases the effectiveness of the aerobic treatment of the liquid in the initial treatment tank and also eliminates the need for any artificial heating of the solids in the bottom of the primary tank to effect digestion thereof. Similarly, the use of solar heat in the trickling filter, as well as in the final clarification tank increases the efficiency of the overall procedure and reduces the time necessary for treatment in each step of the process.

Broadly the invention relates to a process and apparatus for sewage treatment which is constructed and arranged to take advantage of radiant solar heat to aid in the digestive processes in the system and which may be arranged above the earth's surface to decrease the initial cost of installation.

What is claimed is:

1. Apparatus for use in sanitary sewage treatment as a primary sedimentation tank for receiving the sewage including a tank supported on the earth's surface with an inlet therein for receiving the sewage adjacent the top thereof, a continuous annular baffle mounted on the inside of said tank and extending downwardly and in toward the center of said tank, a drum concentrically arranged within said tank and extending above said baffle, and spaced from the sides of said tank, a skirt on the lower end of said drum flaring outwardly toward said continuous baffle and terminating above and in spaced relation to the innermost edge of said baffle, a vertical baffle extending between said tank and drum, a sewage inlet facing toward said baffle whereby the sewage is first discharged against said vertical baffle as it flows into the tank, said drum and skirt thereon in cooperation with said tank and continuous annular baffle forming a circular horizontal and circumferential flow path for the sewage in the tank, a scum baffle arranged adjacent said vertical baffle and on the side of said vertical baffle opposite to the inlet, and a discharge opening in said tank below the level of said scum baffle and between said vertical baffle and scum baffle for discharge of liquid from the tank.

2. Apparatus for use in sanitary sewage treatment as a primary sedimentation tank for receiving the sewage including a tank supported on the earth's surface with an inlet therein for receiving the sewage adjacent the top thereof, a continuous annular baffle mounted on the inside of said tank and extending downwardly and in toward the center of said tank, a drum concentrically arranged within said tank above said baffle, and spaced from the sides of said tank, a skirt on the lower end of said drum flaring outwardly toward said continuous baffle and terminating above and in spaced relation to the innermost edge of said baffle, a vertical baffle extending between said tank and drum, a sewage inlet facing toward said baffle whereby the sewage is first discharged against said vertical baffle as it flows into the tank, said drum and skirt thereon in cooperation with said tank and continuous annular baffle forming a circular, horizontal and circumferential flow path for the sewage in the tank, a scum baffle arranged adjacent said vertical baffle and on the side of said vertical baffle opposite to the inlet, and a discharge opening in said tank below the level of said scum baffle and between said vertical baffle and scum baffle for discharge of liquid from the tank, said circular flow path serving to conduct the sewage in the tank at a slow rate to aid in separating the solids from the liquid, means for discharging the separated solids from the tank at the lower end thereof, and gas vent means for aiding in discharging gas from the tank through said flow path without disturbing the flow of sewage therein.

3. An apparatus for use in sanitary sewage treatment consisting of a tank in which the sewage solids are separated from the liquids, the solids digested and thereafter the digested solids and the liquids separately discharged from the tank, said tank including means defining a sedimentation chamber at the upper portion thereof to separate the liquid from the settleable solids and a digestion chamber in the lower portion thereof to receive the separated solids for anaerobic digestion of the solids, said sedimentation chamber including a circular horizontal and circumferential flow path for the raw sanitary sewage defined by the combination of said tank, a downwardly and inwardly inclined continuous, annular baffle on said tank spaced from the upper end thereof, a drum extending concentrically and downwardly into said tank, a skirt on the lower end of said drum extending continuously thereabout and terminating at a point spaced above the inner end of said annular tank baffle, and a vertical baffle extending between said drum and tank, a sewage inlet facing toward said vertical baffle and against which the incoming raw sewage is first directed to reverse the flow thereof and conduct it horizontally and around the edge of said tank in the area between said tank and drum, a discharge port in said tank on the side of said baffle spaced from said inlet, and a coating on the exterior surface of said tank for aiding in absorbing radiant heat in said tank.

References Cited in the file of this patent

UNITED STATES PATENTS

| | | |
|---|---|---|
| Re. 22,652 | Reybold et al. | June 26, 1945 |
| 117,476 | Sperry | July 25, 1871 |
| 607,426 | Ducat | July 19, 1898 |
| 978,889 | Imhoff | Dec. 20, 1910 |
| 1,210,392 | Alpenfels | Jan. 2, 1917 |
| 1,224,913 | Ferguson | May 8, 1917 |
| 1,642,206 | Imhoff | Sept. 13, 1927 |
| 1,759,334 | Wilson | May 20, 1930 |
| 1,904,246 | Ornstein | Apr. 18, 1933 |
| 2,141,979 | Halvorson et al. | Dec. 27, 1938 |
| 2,359,004 | Schlenz et al. | Sept. 26, 1944 |
| 2,553,228 | Yonner | May 15, 1951 |
| 2,717,873 | Montgomery et al. | Sept. 13, 1955 |

OTHER REFERENCES

Experimental Studies of Bio-Filtration-Jends, Sewage Works Journal, vol. VIII, No. 3 May 1936, pages 401–413, pages 402–403 particularly relied upon.

The Dorr Clarigester, Dorr-Oliver Inc., Barry Place, Stamford, Conn. Bulletin No. 6691-C, 1946, 13 pages.

Sewage Treatment in New Mexico, Sewage and Industrial Wastes, vol. 20 (1948), page 302.